United States Patent [19]

Daudelin

[11] Patent Number: 4,922,519

[45] Date of Patent: * May 1, 1990

[54] AUTOMATED OPERATOR ASSISTANCE CALLS WITH VOICE PROCESSING

[75] Inventor: Abraham N. Daudelin, Colts Neck, N.J.

[73] Assignee: American Telephone and Telegraph Company, New York, N.Y.

[ * ] Notice: The portion of the term of this patent subsequent to Jan. 10, 2006 has been disclaimed.

[21] Appl. No.: 251,262

[22] Filed: Sep. 30, 1988

Related U.S. Application Data

[63] Continuation of Ser. No. 860,651, May 7, 1986.

[51] Int. Cl.$^5$ .................... H04M 3/50; H04M 15/12; H04Q 3/78
[52] U.S. Cl. ........................................ 379/67; 379/88; 379/112; 379/122; 379/223
[58] Field of Search ...................... 379/88, 89, 67, 244, 379/223, 265, 266, 203, 112, 121, 122; 381/43, 110; 364/513.5

[56] References Cited

U.S. PATENT DOCUMENTS

| | | | |
|---|---|---|---|
| 3,614,328 | 10/1971 | McNaughton et al. | 379/213 X |
| 3,920,908 | 11/1975 | Kraus | 379/91 |
| 4,054,756 | 10/1977 | Comella et al. | 379/89 |
| 4,451,704 | 5/1984 | Winkelman | 379/67 |
| 4,468,528 | 8/1984 | Reece et al. | 379/84 |
| 4,481,384 | 11/1984 | Matthews | 379/188 |
| 4,488,005 | 12/1984 | Frantz | 379/88 |
| 4,623,761 | 11/1986 | Winter et al. | 379/84 |
| 4,677,609 | 6/1987 | Piereth et al. | 370/60 |
| 4,757,525 | 7/1988 | Matthews et al. | 379/89 |
| 4,763,350 | 8/1988 | Immendorfer et al. | 379/67 |

FOREIGN PATENT DOCUMENTS

| | | | |
|---|---|---|---|
| 3229659 | 2/1984 | Fed. Rep. of Germany | 379/89 |
| 3236272 | 4/1984 | Fed. Rep. of Germany | 379/216 |
| 3422409 | 12/1985 | Fed. Rep. of Germany | 379/88 |
| 0090663 | 7/1981 | Japan | 379/67 |
| 0086357 | 5/1984 | Japan | 379/89 |
| 0150398 | 8/1985 | Japan | 379/89 |
| 0254958 | 12/1985 | Japan | 379/211 |

OTHER PUBLICATIONS

"Selected Military Applications of Automatic Speech Recognition Technology", Woodward and Cupples, *IEEE Communications Mag.*, Dec. 1983, pp. 35–41.

"Application of Speech Recognition and Synthesis to PABX Services", Mulla and Vaughan, *Electrical Communication*, vol. 59, No. 3, May 1985, pp. 273–280.

N. X. DeLessio et al., "An Integrated Operator Services Capability for the 5ESS Switching System", *ISS '84*, (Florence), Session 22C, Paper 3, May 1984, pp. 1–5.

S. D. Hester et al., "The AT&T Multi-Mode Voice Systems-Full Spectrum Solutions for Speech Processing Applications", *Proceedings of the 1985 AVIOS Conference*.

J. P. Moosemiller, "AT&T Conversant TM I Voice System", *Speech Technology*, Mar./Apr. 1986, pp. 88–93.

J. W. Johnson et al., "Integrated Digital Services on the 5ESS TM System", *ISS '84*, (Florence), Session 14A, Paper 3, May 1984, pp. 1–8.

*Primary Examiner*—Thomas W. Brown
*Attorney, Agent, or Firm*—Werner Ulrich

[57] ABSTRACT

A method and apparatus for identifying the class of an operator assistance call in order to reduce the operator work time for serving such a call. A customer dials 0 or dials 0 plus a directory number and is connected to a program controlled operator assistance system or switch. The switch initially connects the calling customer to a voice processing unit and prompts the customer to speak a command or key a command code. The command or command code is recognized and used to direct the flow of the control program to selectively defer a connection to an operator position. For example, for person-to-person calls, the operator position is only connected after the called customer terminal answers. Advantageously, such a method and apparatus substantially reduces operator work time for broad classes of frequently used operator assistance services.

14 Claims, 11 Drawing Sheets

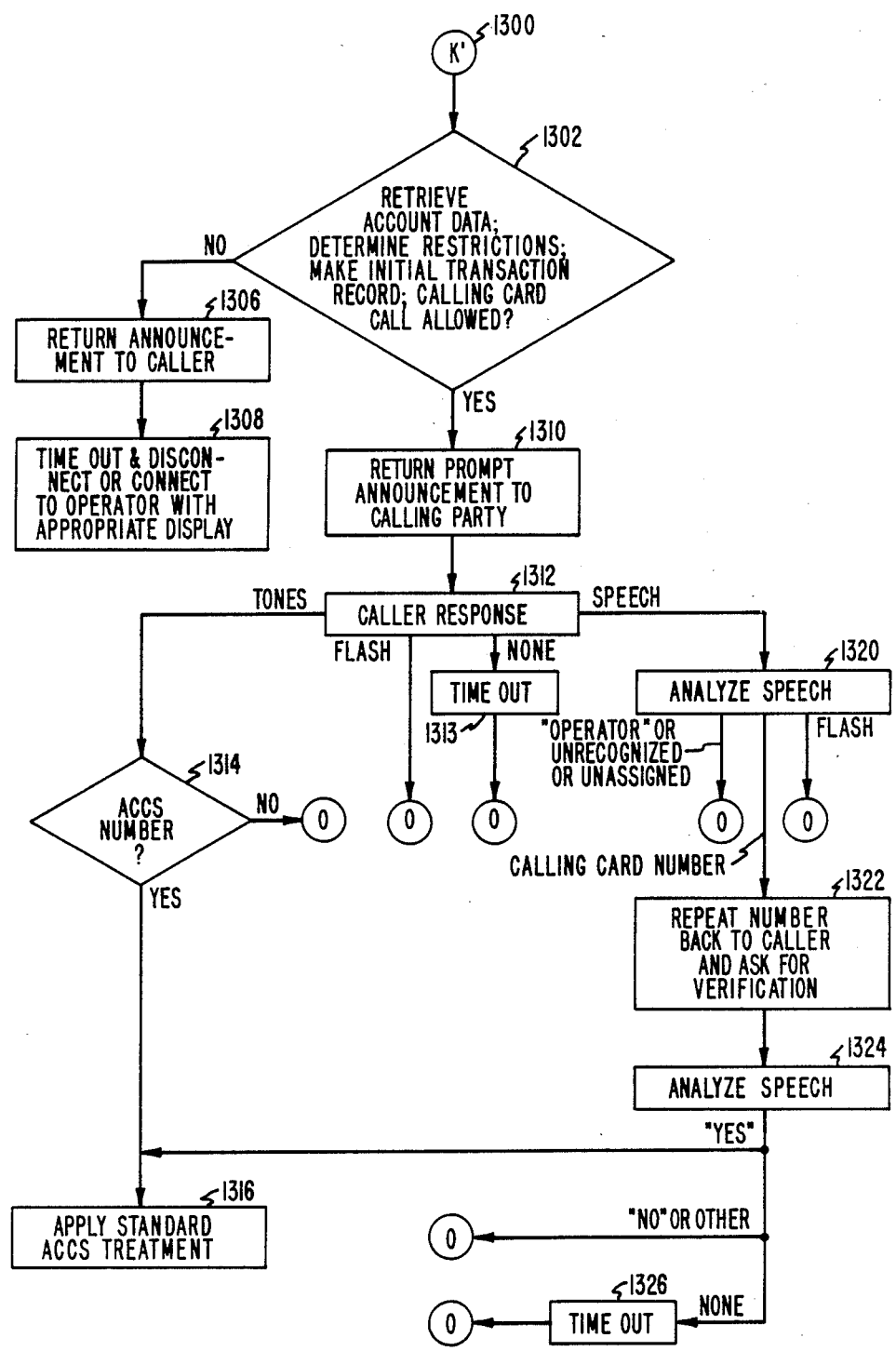

AUTOMATED OPERATOR ASSISTANCE CALLS WITH VOICE PROCESSING

CROSS REFERENCE TO RELATED APPLICATIONS

This application is a continuation of application Ser. No. 860,651, filed May 7, 1986, and is assigned to the assignee of that application; this application is also related to U.S. Pat. No. 4,797,910 which issued from application Ser. No. 860,651 to the inventor of this application and which patent is also assigned to the assignee of this application.

TECHNICAL FIELD

This invention relates to the provision of telecommunications operator assistance services, and, more specifically, to the automation of provision of such services.

BACKGROUND OF THE INVENTION

Operator assistance calls which require services by operators are costly because of high labor costs. Hence, there has been increasing emphasis in recent years on fully automating the serving of some such calls and on reducing operator work time of others so that the labor costs on these calls is reduced. For example, the automated Calling Card Service (aCCS) offered through the use of the Traffic Service Position System manufactured by AT&T Technologies, Inc. permits customers who have dual tone multifrequency (Touch-tone) key telephones to key their calling card numbers so that operators are not required for station-to-station calling card calls. However, such systems still do not serve dial telephones because dial signals cannot be readily transmitted to operator services systems from the older analog switches such as the widely deployed 5 Crossbar System formerly manufactured by AT&T Technologies, Inc.

In addition, certain types of calls can only be identified through a verbal exchange between a customer and a telephone operator. It might be possible to modify the more modern telephone switches such as the 1A-ESS ™ or the 5ESS ™ switches, manufactured by AT&T Technologies, Inc., to recognize a broader dialing plan which would include preliminary digits to identify the class of an operator assistance call, or to have customers with key telephones key additional numbers into an operator assistance system as suggested, for example, in U.S. Pat. No. 4,054,756 of W. K. Comella and B. J. Yokelson. However, since a basic objective of orderly introduction of advanced services is to retain a numbering plan that is observed throughout the nation for customers with dial or key telephones, such an arrangement has not been deployed, since customers with dial telephones or connected to older switches could not be served.

The present method of serving operator assistance collect calls and person-to-person calls consumes a substantial amount of operator work time. Operators are attached to the call as soon as the calling customer finishes dialing. The operator then ascertains the calling customer's wishes, signals to have the call completed, waits for the called customer to answer and then ascertains whether the collect call or person-to-person call may proceed and charges be incurred. Thereafter, the operator may disconnect from the call. A problem of the prior art therefore is that certain classes of operator assistance calls use a large amount of expensive operator work time.

SUMMARY OF THE INVENTION

The above problems are solved and an advance is made in the art in accordance with my invention wherein, illustratively, a voice processing system is used to recognize spoken commands to determine the class of an operator assistance call, and to defer attachment of an operator position to the call until such attachment is required for the specific class that has been determined. Illustratively, such a voice processing system may recognize spoken commands identifying a collect call and a person-to-person call. Such calls may then be set up and an operator only be called into service for a person-to-person call when the call has already been answered, in order to verify whether the correct person is being reached. Illustratively, for collect calls, an announcement is made to alert the called customer and that customer's response is analyzed by the voice processing system to see if it is affirmative. Advantageously, such an arrangement sharply reduces operator work time. For person-to-person calls, the operator is only attached to the call after the called customer answers; for some classes of collect calls, an operator is not required at any stage. Advantageously, if the called customer is busy or doesn't answer, no operator work time is expended. Advantageously, for calls where an operator is required, preprocessing and transaction recording may be performed by the switch to reduce operator work operations, hence operator work time. For example, the operator can be notified that a calling card call is being made, and the system can arrange to accept data keyed by the operator directly as calling card data; this further reduces the operator work time.

Illustratively, a combined voice processing system with tone recognition capabilities may be used so that if a customer has a telephone capable of generating tones, such as a dual tone multifrequency telephone, that customer may key his command instead of verbally stating the command. Advantageously, such a keyed command can be recognized with essentially zero error. Advantageously, such an arrangement permits a common dialing plan to be used by both dial and dual tone multifrequency telephones.

In accordance with one aspect of the invention, a tone or announcement prompts a calling customer to speak a command or to key a command code. Advantageously, such prompting ensures that a voice processing system is ready to accept a command or command code.

In accordance with another aspect of the invention, a spoken command or keyed command code is used to access one of a number of operator teams, such as a Spanish-speaking team, or a team for setting up conference calls, or a group of operators of a customer credit and service bureau. Advantageously, the customer gets immediate access to operator teams prepared to handle special requests.

In accordance with another aspect of the invention, data for calling and called customers is accessed in order to determine, for example, for a collect call, whether the services of an operator are needed. If the data for a called terminal so specifies, for a collect call the voice processing system can recognize a spoken "yes" or a keyed acceptance command. Advantageously, such a method and arrangement eliminates the need for an operator for substantial classes of calls.

More generally, in accordance with my invention, a calling customer terminal requesting an operator assistance call is initially connected to a voice processing system, and a spoken command from the calling customer is analyzed to identify the class of the operator assistance call in order to selectively defer connection of an operator position to the calling customer.

BRIEF DESCRIPTION OF THE DRAWING

The invention will be better understood from the following detailed description when read with reference to the drawing in which:

FIGS. 2–13 are a series of flow charts for programs to control the operation of the telecommunications switch in order to provide operator assistance services.

DETAILED DESCRIPTION

Figure 1:
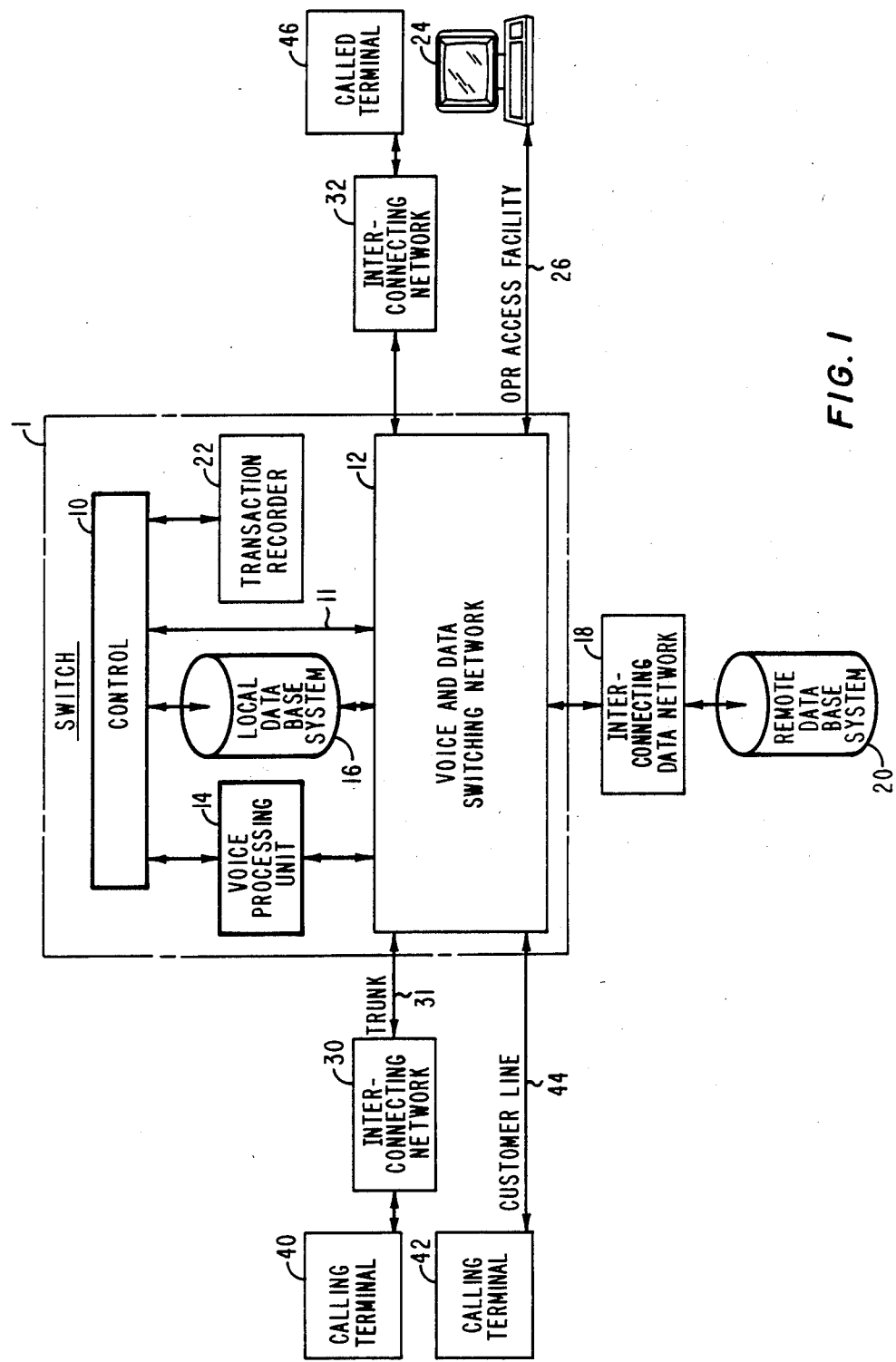
FIG. 1 is a system block diagram of an exemplary telecommunications switch for offering operator assistance services that includes a voice processing system and a control for executing program instructions to control the switch.
Figure 2:
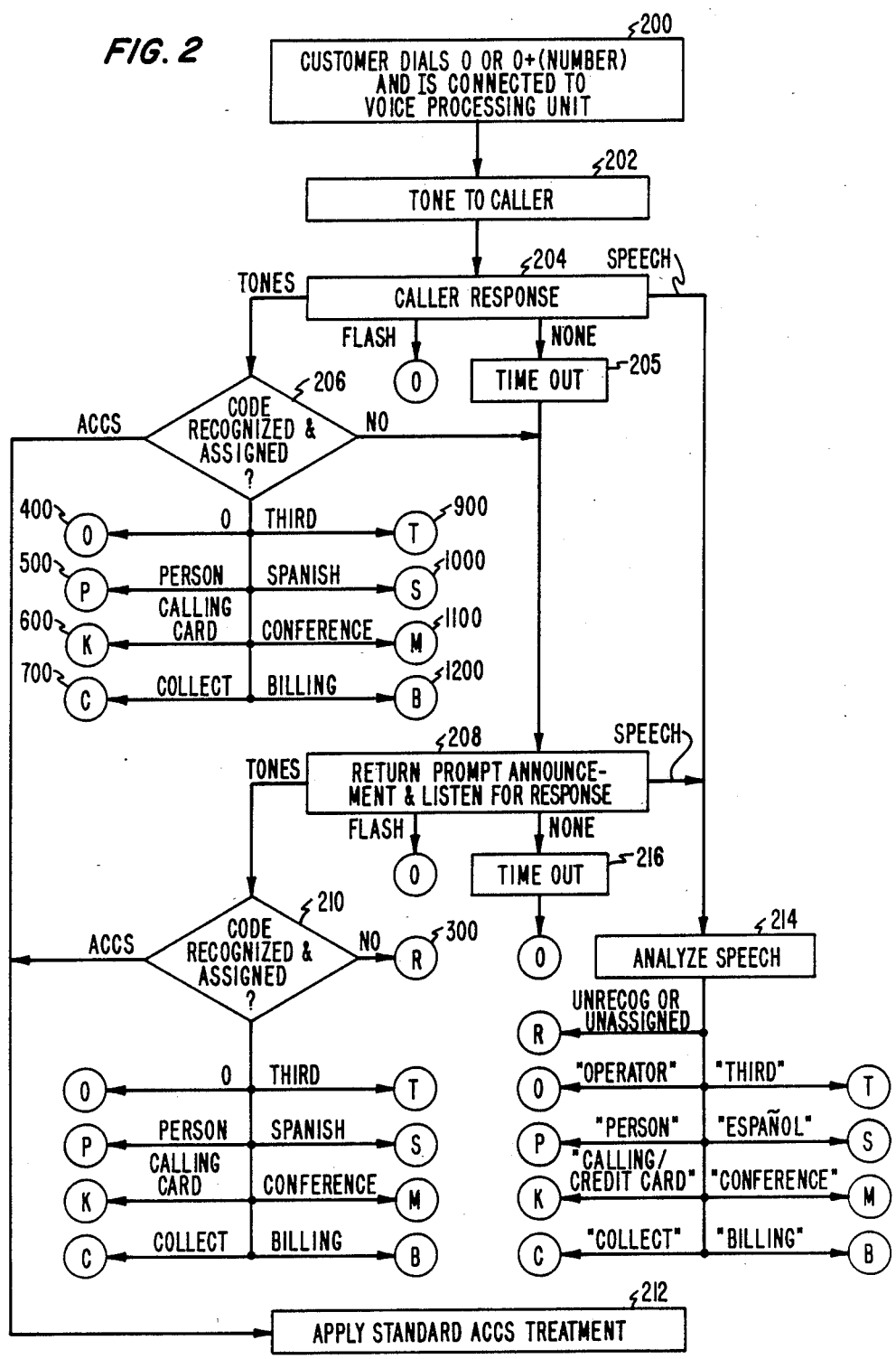

The principles of the present invention may be understood by examining an exemplary embodiment. FIG. 1 is a block diagram of a system arranged to incorporate the present invention. Block 1 represents a telecommunications switch operating under stored program control and having within it the elements necessary for practicing the invention. Switch 1 is a switch such as the 5ESS switch manufactured by AT&T Technologies, Inc., arranged to offer the Operator Services Position System (OSPS) features. The 5ESS switch is described, for example, in *AT&T Technical Journal*, v. 64, no. 6, part 2, pp. 1305–1564, and the OSPS feature is described, for example, in Paper 3, Session 22C presented at the International Switching Symposium in May, 1984.

Within switch 1 are various blocks for carrying out the functions of a telecommunications switch. Control 10 is a distributed control system operating under the control of a group of data and call processing programs to control various blocks of the switch. In order to practice the present invention, the operator services control programs must be augmented by programs described in the flow charts of FIGS. 2–13. Control 10 is shown with heavy borders to indicate that the control is used for practicing the present invention. Block 12 is a voice and data switching network capable of switching voice and/or data between inputs connected to the switching network. Connected to the network 12 is an automatic voice processing system, voice processing unit 14, a unit shown in heavy shading to indicate that this unit is used for practicing the present invention. The voice processing unit receives an input signal which may be either voice or a dual tone multifrequency (DTMF) signal and has the capability for analyzing that signal to distinguish among the various allowable DTMF signals and among the individual elements of a predetermined list of spoken responses. The voice processing unit also generates tones and voice messages to prompt a customer to speak or key information into the system for subsequent recognition by the voice processing unit. In addition, the voice processing unit has the capability for recording a short customer response for subsequent playback to a called terminal. These recordings may also be saved for subsequent use in fraud detection. For example, evidence can be accumulated for stations with a high propensity for fraud. The recordings can also be used as proof of acceptable of charges in case of customer complaints. The voice processing unit generates an output data signal, representing the result of the voice processing; this output signal is sent to control 10 and is used as an input to the program for controlling establishment of connections in switching network 12 and for generating displays for operator position 24. The Conversant TM 1 Voice System, Model 80, manufactured by AT&T Technologies, Inc., is one unit which can be used to carry out the functions of the voice processing unit.

Two types of data base systems are used by switch 1 in order to set up operator assistance calls in conformance with the principles of this invention. These data base systems are shown in heavy borders to indicate that they are used for implementing features of the present invention. Local data base system 16 is directly accessible by control 10 of switch 1 via switching network 12. Remote data base system 20 is accessible to control 10 of switch 1 via switching network 12 and an interconnecting data network 18. A remote data base system is typically used for storing data that is shared by many switches. For example, a remote data base system might store data pertaining to customers for a region; the particular remote data base system that is accessed via data network 18 would be selected to be the remote data base system associated with the region of the called terminal. Interconnecting data network 18 can be any well known data network and specifically could be a common channel signaling system such as the the international standard telecommunications signaling system CCS 7.

Transaction recorder 22 is used for recording data about calls for subsequent processing. This data typically is billing data which is subsequently processed by a billing processor in order to prepare customer bills. The transaction recorder is also used for recording traffic data in order to engineer additions properly and in order to control traffic dynamically.

Operator position 24 connected to switch 1 comprises a terminal for use by an operator in order to control operator assistance calls. Data displays for the terminal of operator position 24 are generated by control 10. Operator position 24 is connected to the voice and data switching network 12 by operator access facility 26 which may include carrier facilities in order to allow the operator position to be located remotely from switching network 12. Alternatively, operator access facility 26 may be a simple voice and data access facility if the operator positions are located in close physical proximity to the switching network. Only one operator position is shown in FIG. 1 but it is understood that a typical switch, arranged to offer operator assistance services, has access to a large number of such operator positions.

It is often desirable that certain kinds of operator functions be assigned to specialized teams. One example is Spanish-speaking operators who could be accessed by customers with English language difficulties whose native language is Spanish. Another example is operators who have access to the special facilities required for setting up conference calls. Still another example is operators from a customer credit and service bureau who have access to customer billing records who can handle customer requests for billing information and for credit in case a customer reached a wrong number. In order to access the proper one of these operator teams, a customer's spoken command, or, in the case of a customer with a DTMF terminal, a keyed command code is used. In some cases (not shown in FIG. 1) specialized teams may be attached to a different switch in which case an interconnecting network is used to connect the originating customer to that switch for connection to an operator from an appropriate operator team.

Connected to switch 1 are interconnecting networks 30 and 32. These are networks which may include one or more switches and which are used for interconnecting voice and data signals between customer terminals and switch 1. Also connected to switch 1 are customer lines, including customer line 44, for connecting a calling terminal 42 to switch 1. The word "terminal" as used herein includes a simple customer telephone station, a customer station with more elaborate features such as magnetic strip card readers, or a customer voice/data terminal. Calling terminal 40 is connected through interconnecting network 30 to switch 1. In this specific example, calling terminal 40 is connected by a customer line to a 1AESS switch and that switch is connected to trunk 31 which is connected to switch 1. For the sake of clarity, a separate interconnecting network 32 is shown as being interposed between switch 1 and called terminal 46. In practice, interconnecting networks 30 and 32 are parts of a much larger common carrier network. In the example call described below, interconnecting network 32 contains different switches from interconnecting network 30. Called terminal 46 is connected to interconnecting network 32 and via that network can be accessed by switch 1. If the calling terminal is not directly connected to switch 1, the directory number of the calling, terminal, identified, for example, by automatic number identification, is transmitted from the switch connected to the calling terminal to switch 1.

The term "operator assistance call" as used herein also refers to calls some of which are already automated. For example, automated Calling Card Service (aCCS) has made it possible for customers having a DTMF terminal to place a calling card call without requiring the services of an operator. As discussed hereinafter, other classes of operator assistance calls may also no longer require the service of an operator according to the teachings of this invention. Thus, the term "operator assistance call" refers to those classes of calls which have in the past usually required the service of an operator, such as those which are dialed with an initial digit 0.

In order to illustrate the basic principles of the invention, a simple collect call from calling terminal 42 to called terminal 46 will be described. The customer at a calling terminal is referred to as a calling customer or caller. In this example, the called customer at terminal 46 has agreed ahead of time to accept collect calls but wishes to be informed when an incoming call is a collect call. The caller at terminal 42 dials or keys 0, followed by the directory number of called terminal 46. This number which is dialed over customer line 44 is received in voice and data switching network 12 and passed to control 10 via control access 11. Control 10 analyzes this dialed (using a dial terminal) or keyed (using a DTMF terminal) number and recognizes that calling terminal 42 has placed some kind of operator assistance call. In order to determine whether this is a calling card, bill to third party (third), person-to-person (person), collect, Spanish-speaking (Spanish), conference, billing or other operator assistance call, it is necessary to connect the calling customer at terminal 42 to voice processing unit 14. After this connection has been established, voice processing unit 14 returns a (prompting) tone to calling terminal 42. In response to this tone, if the calling customer at terminal 42 has a DTMF telecommunications terminal, the customer will dial a two-digit command code identifying the class of the call to be placed as a collect call. If the calling customer does not have a DTMF terminal or chooses to speak, then the customer can speak one of the following eight phrases: collect, calling card, person, third number, operator, español (to request a Spanish-speaking opratortor), conference, or billing, and, in this case, will say "Collect". If the calling customer fails to key in the command code or to speak the command, he or she will be prompted by an announcement which says: "Please say collect, calling card, person, third number, espanol, conference, billing, or operator now." The keyed command code, or the spoken command is analyzed by voice processing unit 14 which determines that a collect call is to be set up. The tone or announcement is used to prompt the calling customer to give the requested response. After a time, only the tone may be required since customers will learn to interpret the tone as a prompting signal.

A connection is then set up through interconnecting network 32 to called terminal 46. The characteristics of called customers, with respect to what kinds of collect calls they will accept, are stored in regional data base systems such as remote data base system 20 which contains data for called terminal 46. Other kinds of originating and terminating customer data are stored in local or remote data base systems as convenient. System 20 is queried while the connection to the called customer is being established. For this example call, the query indicates that the called customer will accept all collect calls but wishes to be informed that an incoming call is collect.

When called terminal 46 answers, the answer signal is transmitted back to switching network 12 and is passed to control 10 via control access 11. When control 10 receives this answer signal, control 10 sets up a connection in switching network 12 from voice processing unit 14 through interconnecting network 32 to called terminal 46 to announce to the called customer that this is a collect call. Since called customer 46 has agreed in advance to accept all collect calls, the call between calling terminal 42 and called terminal 46 may be set up through switching network 12 after this announcement has been received by the called customer. As a further check, and to reassure the calling customer, that customer receives an announcement from voice processing unit 14 while the call is being set up, to indicate that a collect call is being set up from his terminal to the called customer. Note that this exemplary call has been established without requiring the services of an operator.

Customers may specify that they will accept all collect calls, that they wish to decide without further data whether or not to accept each collect call, that they want to know the name of the calling party and wish to decide for each call, or that they will accept no collect calls. Alternatively, an announcement to the called customer announcing a collect call could include the area code, the geographic locality, or the full directory number of the calling customer in order to supply the called customer with further call data that he can use in order to decide whether to accept the call.

FIGS. 2–13 are flow diagrams of the process of handling operator assistance calls. The process begins when a customer dials 0 plus a directory number, or dials 0 and nothing else for a predetermined interval of about 5 seconds. The customer is then connected to the voice processing unit 14 (action box 200, FIG. 2). Voice processing unit 14 returns a tone to the caller (action box 202). The response of the system depends on the input from the calling customer (decision box 204). If the calling customer speaks, the program executes a transfer to box 214, discussed further below. If the calling customer keys DTMF signals into the system, test 206 is performed. Test 206 determines whether the numbers represented by the customer's keyed tones correspond to one of the codes used for identifying the class of an operator assistance call, or the format of a calling card number, or neither. If the tones correspond to the format of a calling card number, standard automated Calling Card Service (aCCS) treatment of the call is invoked (action box 212). With this standard treatment, the calling customer's calling card number is checked for validity, and, if the calling card number is valid, the call is completed. Eight command codes are assigned to identify eight classes of operator assistance calls; the eight classes are operator (O), collect (C), calling card (K), person-to-person (P), third party billing (T), Spanish (S), multi-party conference (M), and billing credit (B). The codes for these eight classes of calls might, for example, be the digits 12-19. 1 is a preferred initial number for these codes since this number can never be the initial number of a calling card. By using 1 as the initial digit, it is not necessary to time for possible additional digits after a two-digit command code has been keyed. The present embodiment of the invention can therefore be used without interfering with aCCS treatment of credit card calls. In terms of the flow chart, once one of these eight codes is recognized, the appropriate subroutine for handling this type of call is entered. These subroutines have been called O for operator (subroutine 400), C for collect calls (subroutine 700), K for calling card calls (subroutine 600), P for person-to-person calls (subroutine 500), T for third party billing calls (subroutine 900), S for Spanish-speaking operator (subroutine 1000), M for multi-party conference operator (subroutine 1100), and B for (billing) customer credit and service bureau operators (subroutine 1200).

If no code is recognized (test 206) or if no tones have been transmitted from the customer to the system within a predetermined interval (timeout, action box 205), the voice processing unit 14 returns a prompt announcement such as "Please say collect, calling card, person, third number, espanol, conference, billing, or operator now," and awaits a response by the calling customer. If tones are detected when this announcement has been made, test 210, similar to test 206, is performed. Test 210 checks the code represented by the tones keyed by the calling customer. If these tones correspond to a calling card number, the program executes a transfer to action box 212 in order to apply the standard automated Calling Card Service (aCCS) treatment. If one of the eight operator assistance command codes is recognized, a transfer to the corresponding one of the eight subroutines is executed. If an unrecognized code has been keyed, a transfer is executed to subroutine R (subroutine 300, FIG. 3) to give the calling customer a reprompt announcement.

If decision boxes 208 or 204 recognize speech, then this speech is analyzed (decision box 214) in order to detect one of the eight types of operator assistance calls, or to detect that the speech signal is inadequate to properly classify the type of operator assistance call. If a request for one of the eight classes of operator assistance calls is recognized, then a transfer is made to one of the eight subroutines, O, C, K, P, T, S, M, or B; if no command corresponding to an operator assistance call is so recognized, a transfer is made to subroutine R (subroutine 300, FIG. 3) for a reprompt announcement.

If, at the time that the caller response is analyzed in decision box 204, a customer flash is recognized, a transfer is made to subroutine O (subroutine 400, FIG. 4) in order to connect the customer to an operator. A customer may always flash in order to be connected to an operator. Similarly, if, following the prompt announcement (decision box 208), the customer flashes, a transfer is made to the subroutine O (subroutine 400, FIG. 4). If the customer does nothing following the prompt, a timeout is detected in action box 216 and a transfer to subroutine O (subroutine 400, FIG. 4) is executed in order to connect the calling customer to an operator.

Figure 3:
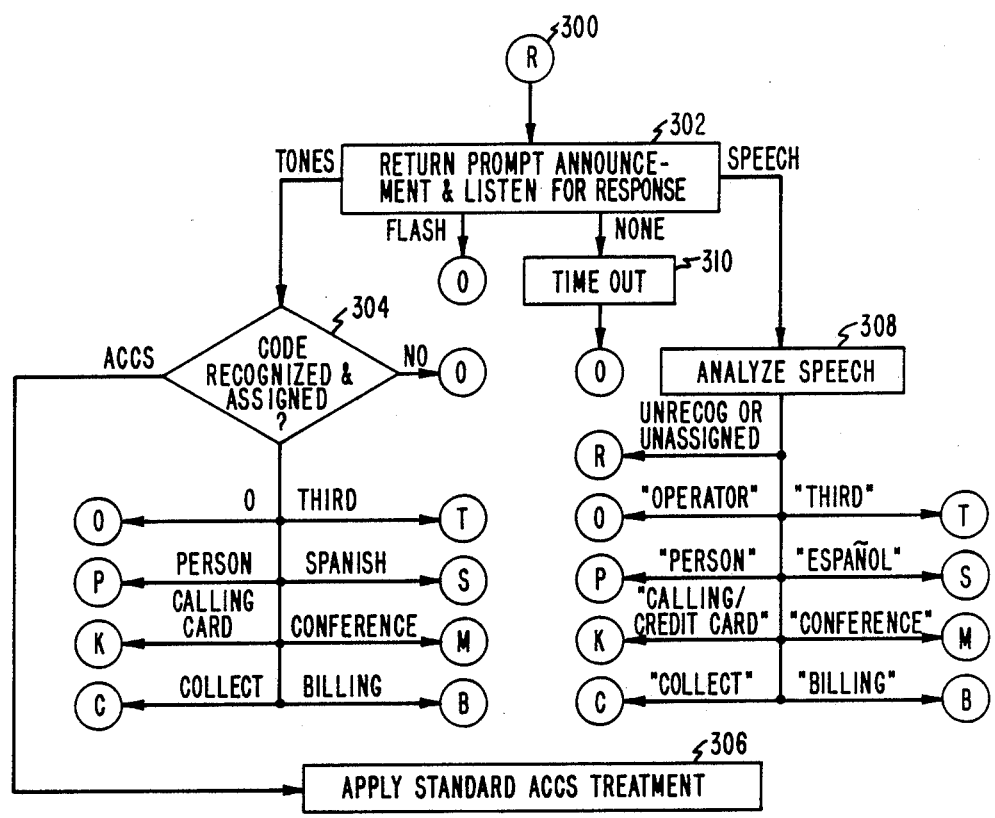

FIG. 3 illustrates the actions performed by the program in case the customer response is unrecognizable speech. The first step of subroutine R (300) is to reprompt the caller with an announcement and listen for a response (decision box 302). If tones are recognized, test 304, analogous to tests 206 and 210, is performed. Test 304 checks for a calling card number, in which case standard automated Calling Card Service treatment is applied (action box 306), or one of the eight codes representing classes of operator assistance calls is recognized, in which case a transfer is executed to one of the eight subroutines O, C, K, P, T, S, M, or B. Finally, if following the reprompt announcement to the caller, a number is keyed in which does not correspond to a legitimate code, the calling customer is connected to an operator (transfer to subroutine O, 400, FIG. 4). Similarly, if a flash is recognized while the customer is responding, a transfer is made to subroutine O to connect the calling customer to an operator. If speech is recognized, the speech is analyzed in decision box 308. The decisions for decision box 308 are the same as those for decision box 214 except that in this case, if after the reprompt announcement to the caller the speech is still unrecognized, the calling customer is connected to an operator. If the customer says nothing, does not key in a tone signal and does not flash, then action box 310 detects a timeout and the customer is connected to an operator.

The reprompt announcement routines of decision box 302 are invoked in large part because of the imperfect characteristics of automatic speech recognition. Whereas it is possible to detect tones with essentially 100 percent accuracy, it is not always possible to make a correct determination of a customer's spoken command. The use of a reprompt announcement and decision box 302 allows a second identification of the customer's command based on a new speech sample; human factors tests may indicate that the reprompt announcement should state the suspected spoken term. (For example, the announcement may say: "Did you request a collect call?")

Figure 4:
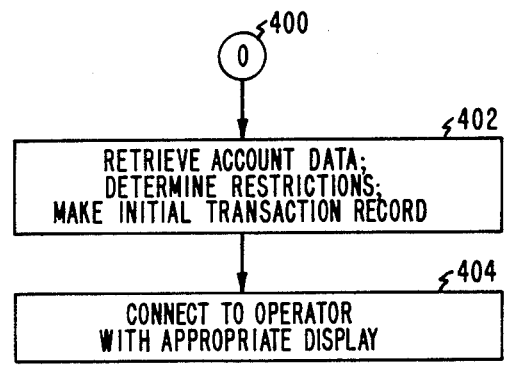

FIG. 4 indicates the actions to be carried out if the calling customer is to be connected to an operator. Subroutine O (400), first retrieves data about the calling number, the called number, and any other pertinent data about the status of the call so that the operator is fully informed and prepared to deal with the calling customer. Data about either party, but especially the called party, may be obtained from a remote data base system such as data base system 20 (FIG. 1). This data includes restrictions on either the calling or the called customer (for example, that the calling customer can only make collect calls or that the called customer will not, or, because it is a public coin station, cannot, accept any collect calls). In addition, the initial transaction record for future billing and traffic purposes is made on the transaction recorder 22 (FIG. 1). Next, the calling customer is connected to the operator whose operator position has been initialized with that subset of the data retrieved in action box 402 (action box 404) which is pertinent to this type of call. The term "pertinent data" as used herein refers to that subset of accessed data which is pertinent to the call. Subsequently, the operator processes the call in a standard manner.

Figure 5:
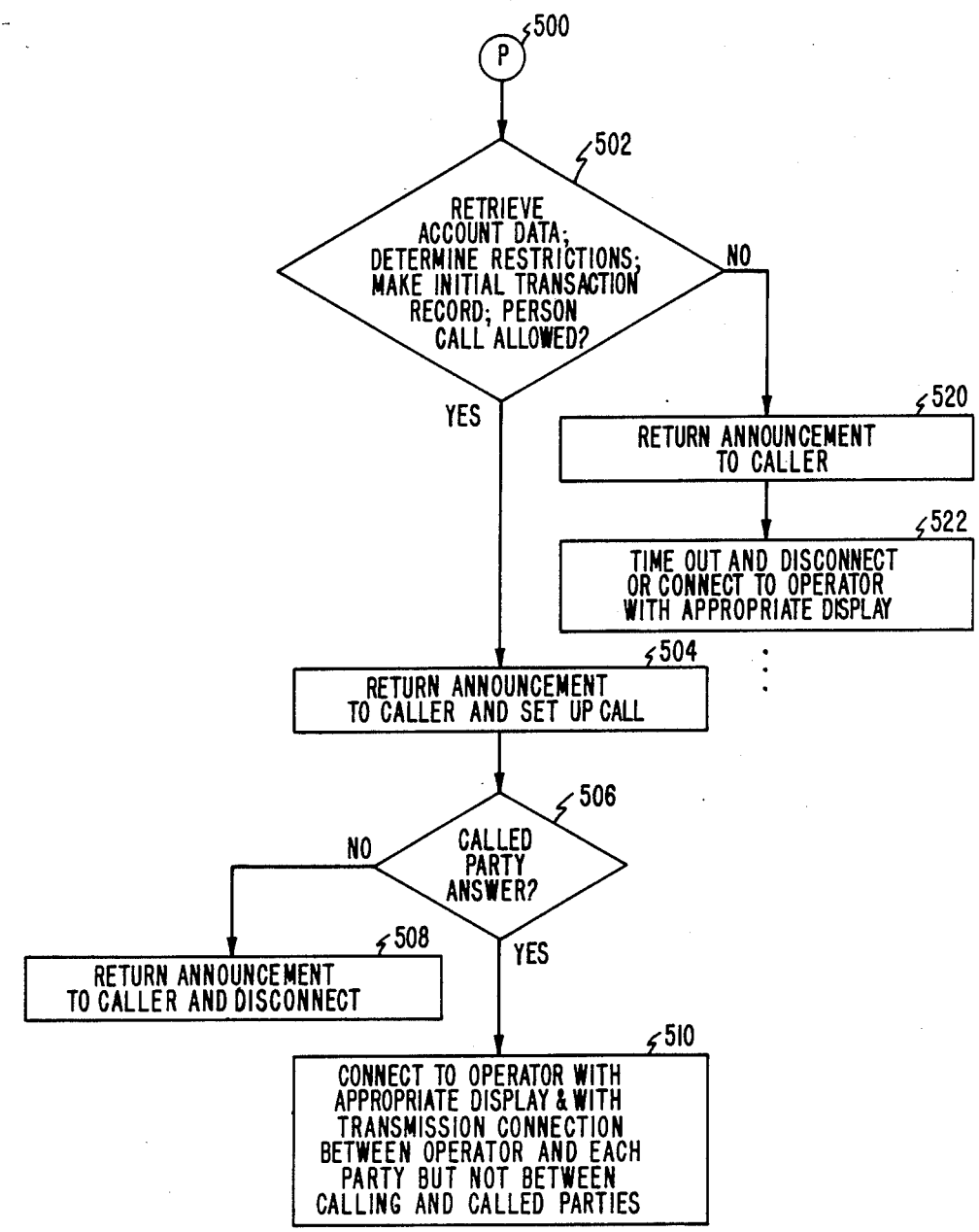

FIG. 5 represents subroutine P (500), the program used for controlling person-to-person calls. The first step (decision box 502) is to retrieve data concerning called and calling parties and determine if there are any restrictions on either party to make person-to-person calls or receive such calls. For example, many prisons allow their inmates to make only collect calls, and therefore would not allow them to make a person-to-person call which is assumed to be billed to the calling party. An initial transaction record is made on transaction recorder 22 (FIG. 1). If a person call is allowed, then an announcement is returned to the calling party (action box 504). This announcement will indicate to the calling customer that the call is being set up. In parallel with this announcement a connection is set up from switch 1 to the called customer. Test 506 determines whether the called customer answers. If the called customer does not answer within a predetermined interval, then an announcement is returned to the calling customer that nobody has answered and the call is disconnected (action box 508). If the calling customer disconnects before that predetermined interval, the call is similarly disconnected. If the called party answers, then the called party is connected through switching network 12 to an operator position which has been initialized with the pertinent data that has been collected for the person-to-person call (action box 510). The operator may then talk with either the calling or the called party, but the calling and called parties cannot talk to each other. Based on input received by the operator in talking to the two customers, the operator will either allow the call to be completed or will disconnect the call. It is desirable to connect person and collect calls in such a way that until billing is verified, the calling and called customers are not connected, and that for bill to third number calls, the calling and third number customers not be connected. This prevents unauthorized and unbillable communications between the calling and called or third number customers, as well as some more complex frauds.

In setting up a person-to-person call in accordance with the methods described herein, it is important that an operator be attached quickly once the called customer picks up. While operator assistance calls are normally placed in an operator assistance request queue to handle calls in an orderly fashion based on time of arrival of the call, person-to-person calls processed as described herein are placed in a special priority queue to reduce sharply the interval from the time that a called customer answers until an operator is attached to the call. As soon as the called customer answers, the call is placed in the priority queue and an announcement is connected to the called customer which states: "Please hold for a person-to-person call." As soon as an operator is available, that operator is connected to the calling customer in order to ascertain the identity of the desired called customer. The operator then requests a connection to the called customer and can talk to either the calling or the called customer without having the calling and called customers talk to each other. The operator ascertains whether or not the call should be completed and the call is either completed or disconnected in accordance with the operator's keyed request.

If the calling customer is violating a restriction in attempting to place a person-to-person call (detected in decision box 502) an announcement is returned to the calling customer (action box 520). If the calling customer then hangs up, the call is simply disconnected. If the calling customer does not hang up within a predetermined interval, then, at the option of the telephone company, the calling customer can either be automatically disconnected or can be connected to the operator whose position will have been initialized with a display containing the pertinent data necessary to communicate with the caller about this call (action box 522).

Figure 6:
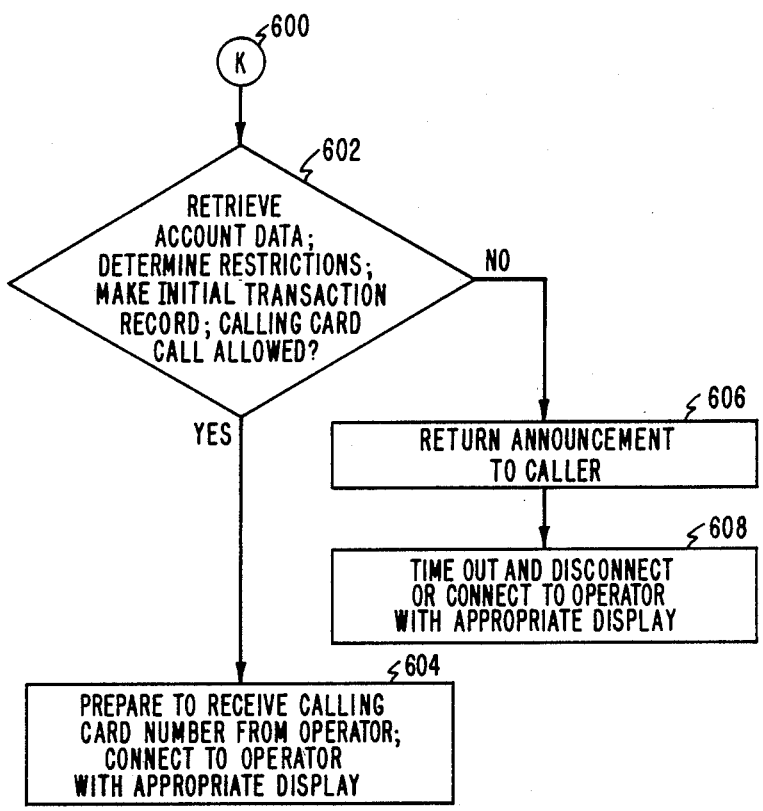
Figure 12:
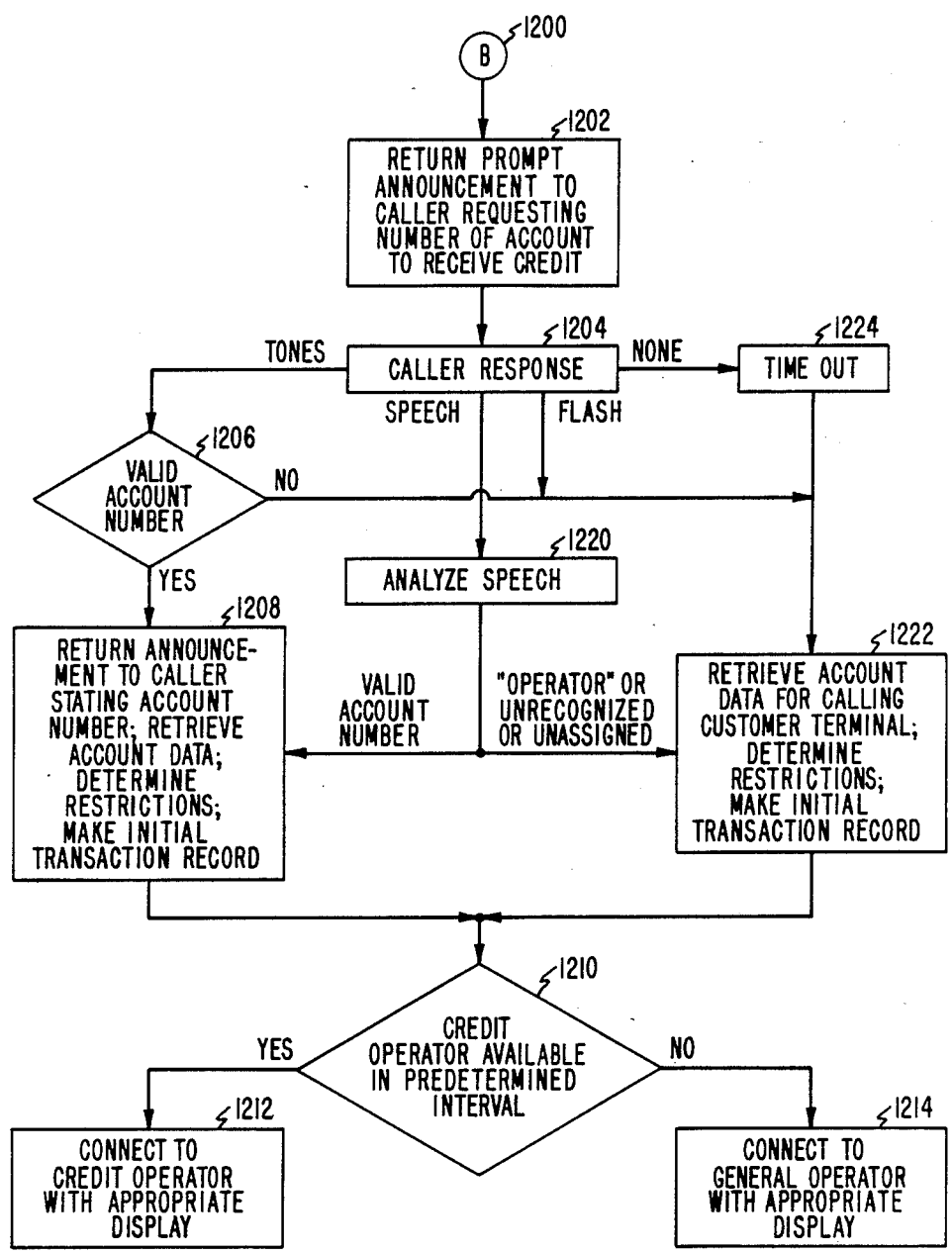

FIG. 6 is a flow diagram of subroutine K (600) for controlling certain calling card calls. Subroutine K of FIG. 6 is entered if the calling card customer is not calling from a DTMF terminal, but wishes to place a calling card call, or if the customer, for some other reason, wishes to speak instead of keying the calling card number. (An alternative version of subroutine K, namely, subroutine K' (1200), is shown in FIG. 12 and is described hereinafter.) Decision block 602 describes the initial actions carried out for such calls. The system retrieves data concerning the calling and called customer to see if there are any restrictions, makes an initial transaction record using transaction recorder 22, FIG. 1, and determines whether a calling card call is allowed. If a calling card call is allowed, then the control 10 is primed to receive a calling card number keyed in from the operator, i.e., to interpret numerical data keyed in by the operator as representing a calling card number. A connection is set up between the calling customer and the operator whose position has been initialized with a display indicating the characteristics of the call and additional pertinent data about the calling and called customers (action box 604).

If it is determined that a calling card call is not allowed, then an announcement is returned to the calling customer (action box 606). If the calling customer hangs up, the call is disconnected; othersise, after a predetermined interval, the calling customer is either automatically disconnected or connected to an operator whose operator position has been initialized with the pertinent data (action box 608) so that the operator can explain to the customer what happened.

For serving calling card calls, it may be desirable to recognize "credit card" as well as "calling card" as a legitimate command. Many customers still use the term "credit card" when they refer to a telephone calling card.

Figure 7:
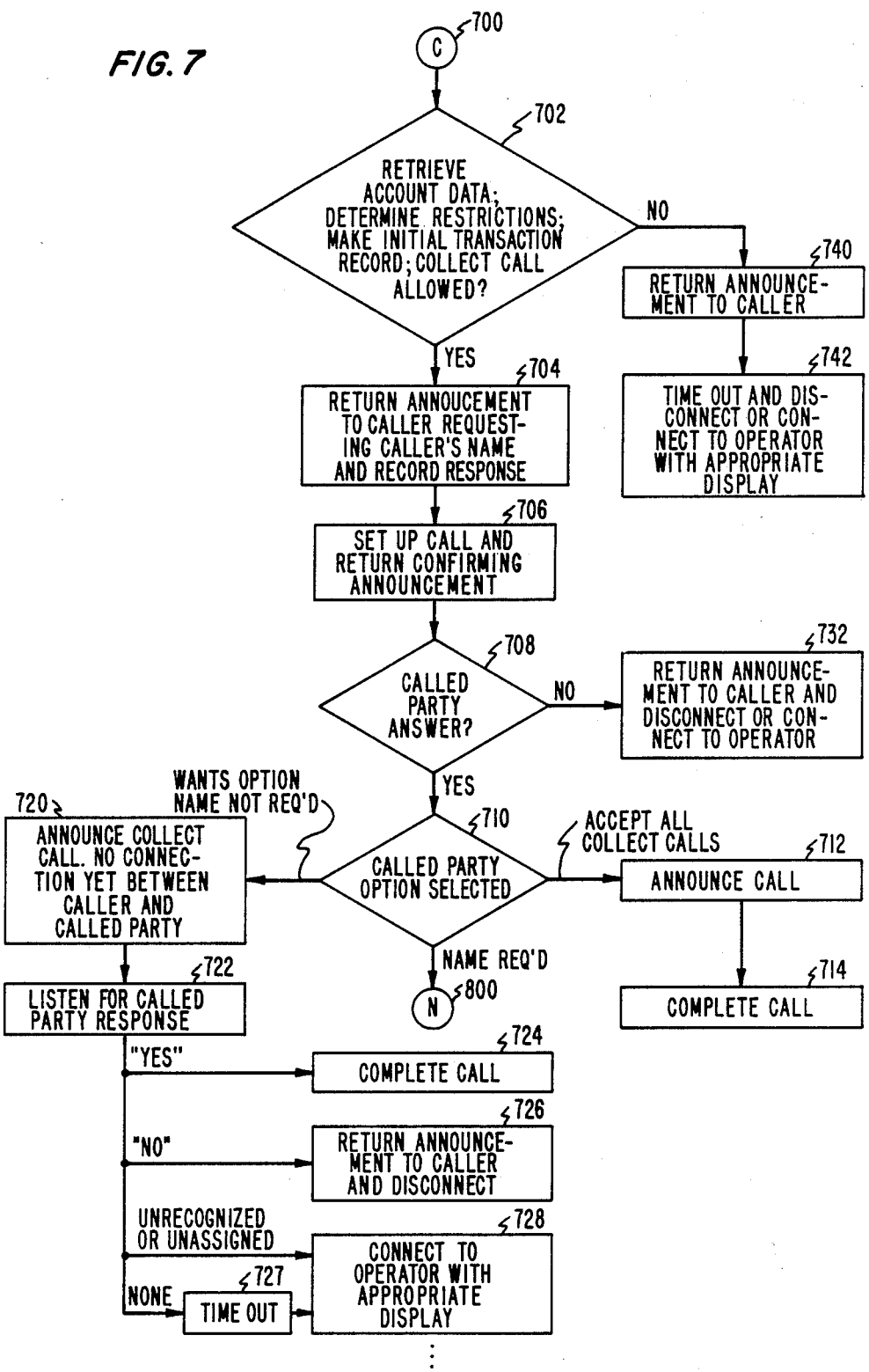

FIG. 7 is a flow diagram of subroutine C (700), the program used for processing collect calls. Initially, (decision block 702) the data for the calling and called customers is obtained in order to check for restrictions. In this case, the restrictions tend to be dependent on the called customer as described with respect to the example call. An initial record is made using transaction recorder 22. If collect calls are allowed then an announcement is connected to the calling customer. This announcement requests the calling customer to announce his name so that the name can be recorded for possible subsequent transmission to the called customer (action box 704). The call is then set up and an announcement confirming reception of the calling customer's name response is returned to the calling customer (action box 706). Test 708 checks whether the called party answers before a predetermined interval has elapsed. Then test 710 is performed to select among the options of the called party. If the called party accepts all collect calls, then an announcement is connected to the called party to announce that a collect call is being set up to the called customer (action box 712) and the call is completed (action box 714). If the called customer wants to make a decision on every call as to whether or not he will accept the call but does not require the name of the calling customer, then the called customer is connected to an announcement (action box 720). The announcement might announce a message such as: "You have a collect call, will you accept charges, yes or no". The voice processing unit which has already been used for making the announcement is then primed to listen for a called party response (decision box 722). If the called party responds a "yes" recognized by the voice processing unit, then the call is completed (action box 724). If the called customer announces "no" recognized by the voice processing unit, then an announcement is returned to the calling customer and the call is disconnected (action box 726). If the voice processing unit either does not recognize the called customer's response, or recognizes it but recognizes it as not being either yes or no, or if no response is made by the called customer within a predetermined interval (timeout, action box 727), then both the calling and the called customers are connected to an operator, whose position has been initialized with a display indicating the status of the call and the pertinent data, in such a way that either the calling or the called customer can talk to the operator, but that the calling and called customers cannot talk to each other. The operator may then take appropriate action to either disconnect the call or to let the call complete with appropriate charging (action box 728). If the called party has selected the name required option, a transfer is made to subroutine N (800) described with respect to FIG. 8.

If the called customer does not answer within the predetermined interval, for example, if the called customer terminal is a public coin station, then an announcement is returned to the calling party indicating that there was no answer and the call is disconnected (action box 732); alternatively the calling customer may be connected to an operator in this case. If no collect call is allowed to this called customer, for example, if the called customer terminal is a public coin station, then an announcement is returned to the calling customer (action box 740) and if the calling customer fails to disconnect within a predetermined interval, the calling customer is either automatically disconnected or connected to an operator whose display indicates the status of the call and pertinent data (action box 742).

Using this arrangement, it is also possible to implement a service similar to present "Enterprise" service without requiring the use of an operator. The data base for the called customer indicates for which originating (area plus office codes) the called customer will accept collect calls. Calls from one of these (area plus office codes) are then automatically accepted.

Part of the reason for making an initial transaction record as one of the first steps of subroutine C (700) is to allow for possible charges for collect calls not completed because of a restriction or decision by a called customer.

Figure 8:
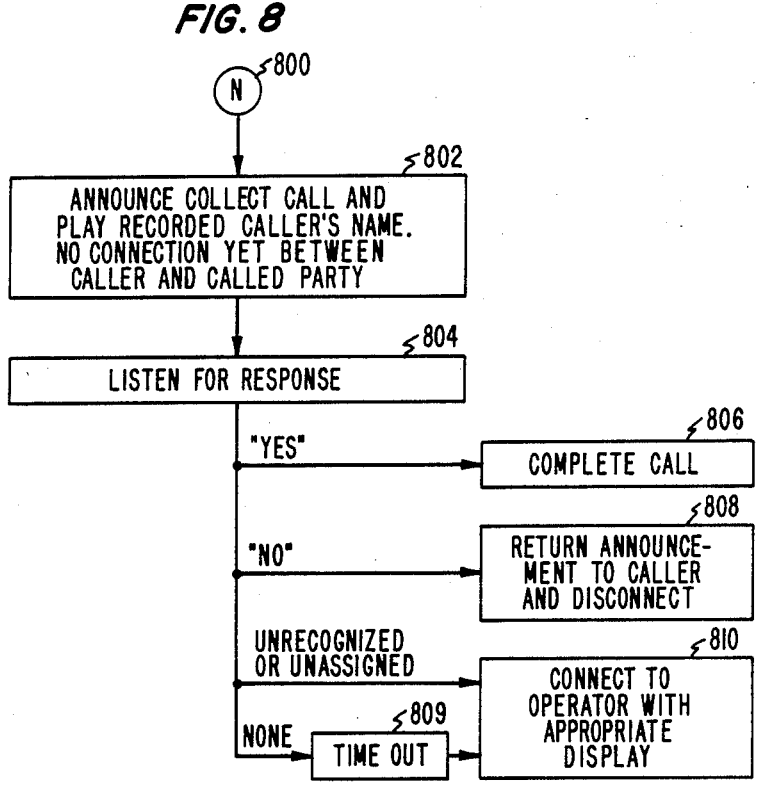

FIG. 8 is a flow diagram of subroutine N used to control collect calls where the called customer has requested that collect calls be announced including the calling customer's name. The announcement of the collect call, in this case, will also include the caller's name previously recorded in action box 704 of FIG. 7 (action box 802). The voice processing unit 14 is then primed to listen for the called customer's response (decision box 804). If the response is recognized as "yes", the call is completed (action box 806). If the response is recognized as "no", then the previously cited announcement is returned to the calling customer and the call is disconnected (action box 808). Finally, if the response of the called customer is either unrecognized or represents an unassigned phrase (i.e., neither yes nor no) or if no response is detected within a predetermined interval (timeout, action box 809), then the calling and called customers are both connected (action box 810) to an operator whose position is initialized with a display indicating the status of the call and pertinent data retrieved in decision block 702 (FIG. 7). The operator can then make a decision as to whether to complete the call or disconnect the parties. As in the case of action box 728, the called and calling parties cannot talk to each other while both are connected to the operator.

Figure 9:
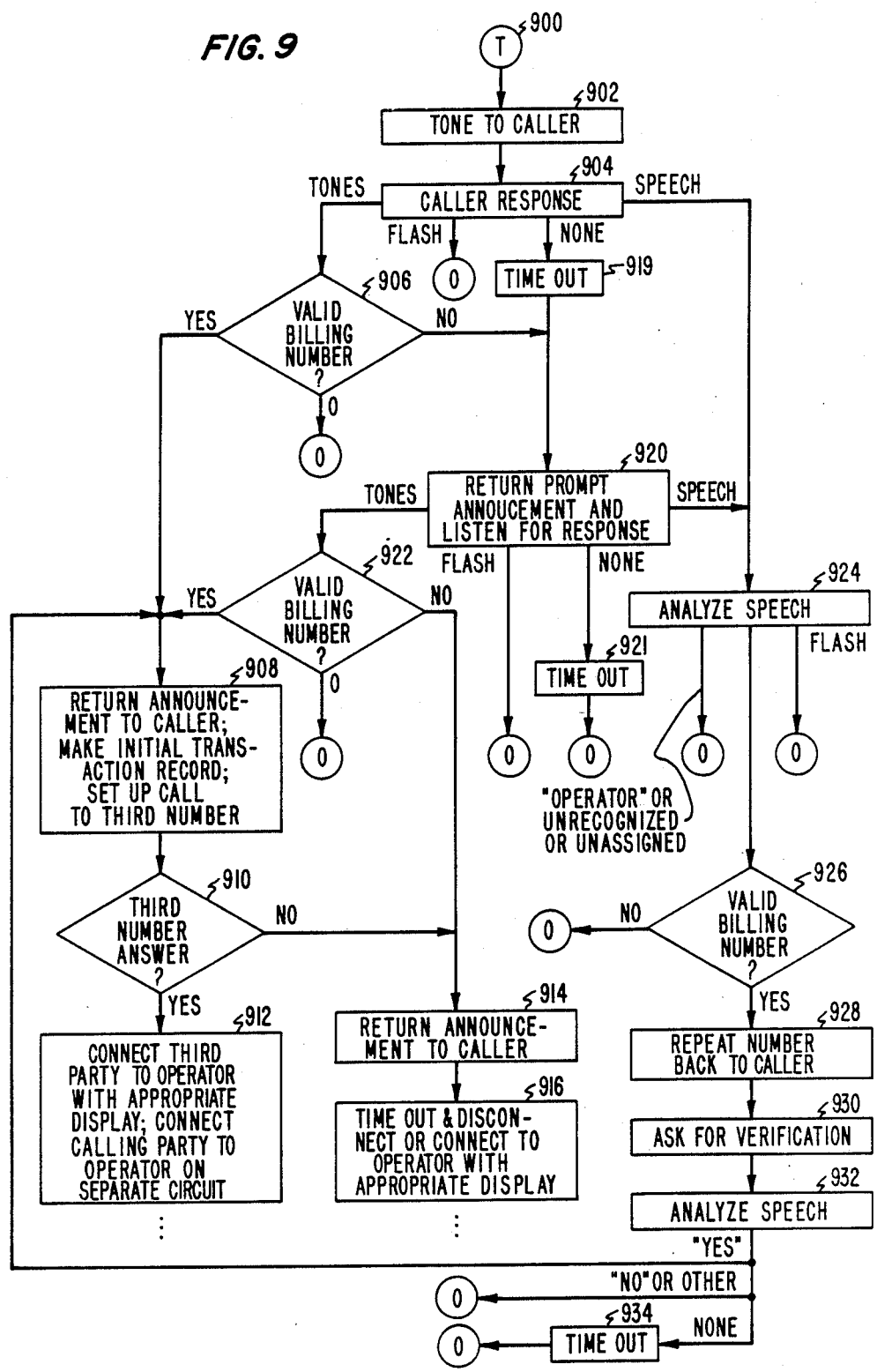

FIG. 9 is a flow chart of subroutine T (900) for controlling calls to be billed to a third party. First a tone is returned to the calling party (action box 902). Note that this is not the same tone which is initially returned to the calling party in action box 202 (FIG. 2), but is a tone returned to the caller after it has been ascertained that the calling customer wishes to have the call billed to a third number. The voice processing unit is primed to analyze the calling customer's response to this tone (decision box 904). If the caller response is one or more keyed DTMF signals, test 906 is used to check whether this represents a valid billing number. For example, directory numbers for coin stations are not valid billing numbers because of the possibility for fraud; the data base for identifying valid billing numbers and collect call class of service can be readily expanded to handle a broad class of such numbers, and can be accessed in the same way as the collect class of service data base discussed previously. If the caller has keyed the number 0, then a transfer is made to subroutine O (400, FIG. 4) to connect the caller to an operator. If a keyed number is a valid billing number, then an announcement is returned to the calling customer indicating that the third party billing is being verified. An initial transaction record is made using transaction recorder 22 (FIG. 1) and a call is set up from switch 1 (FIG. 1) to the customer of the third number (action box 908). Test 910 checks whether the third number answers before a predetermined interval. If the third number answets, the customer at the third number is connected to an operator whose display has been initialized with pertinent data (action box 912). The operator is connected to both the calling number and the third number on separate circuits to that the calling customer and the customer at the third number cannot communicate with each other but that each can communicate with the operator. The operator will then decide, based on the results of communications with the third party, whether the call may proceed or whether it should be disconnected (action box 912). If the third number does not answer, then an announcement is returned to the calling customer (action box 914). If the calling customer does not disconnect before a predetermined interval, then the call is either disconnected or connected to an operator whose display has been initialized with pertinent data to indicate the present state of the call (action box 916).

If the billing number keyed in by the calling customer is not valid, or if the calling customer makes no response to the tone within a predetermined interval (timeout, action box 919), then a prompt announcement is given to the calling customer (decision box 920). The prompt announcement will ask the calling customer to speak the digits of the third number one digit at a time. If at this point the calling customer keys in a number, test 922 performs the same test as 906. If the billing number is valid, then an announcement is returned and other actions are performed as indicated in action box 908. If the calling customer has keyed in a 0, a transfer to subroutine O is executed, and an operator is connected. If the billing number is invalid, then an announcement is returned to the caller (action box 914 previously described). If, following the prompt of decision box 920, a flash or a timeout (action box 921) is detected, a transfer to subrouting O is executed and the calling customer is connected to an operator. If speech is detected as the output of decision box 920 or decision box 904, this speech is analyzed (decision box 924). If no valid billing number is detected (test 926) or a flash is detected or the word "operator" or unrecognizable or unassigned words are detected, a transfer to subroutine O is executed and the customer is connected to an operator.

If a valid billing number is detected then the voice processing unit repeats that billing number back to the caller in order to ensure that the number was correctly recognized (action box 928). This is followed by an announcement asking for verification of the billing number by the caller (action box 930). The caller's spoken response is then analyzed (decision box 932) and, is a "yes" is recognized, action box 908 is entered. Otherwise, if either a "no" is recognized or any other speech signal is recognized, or no speech signal is recognized within a predetermined interval (timeout, action box 934), the caller is connected to an operator.

Figure 10:
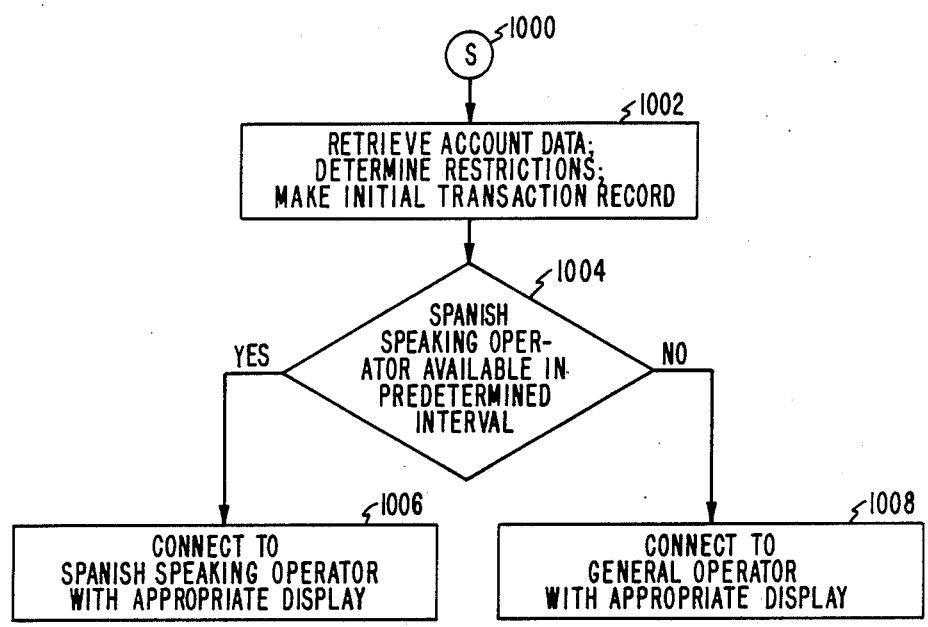
Figure 11:
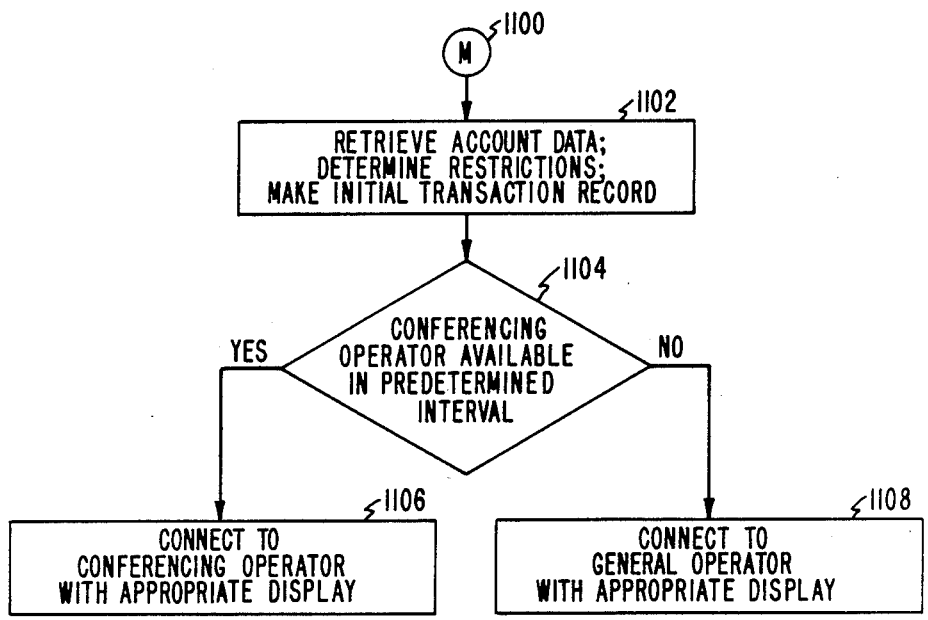

FIGS. 10–12 deal with calls requiring the use of special operator teams. Three types of special operator teams are described herein; a Spanish-speaking team for handling operator assistance calls from customers who prefer to use Spanish in their communication with telephone operators, a second team for setting up conference calls, and a third team associated with a customer credit and service bureau for handling customer inquiries on billing and for handling requests for refunds. Other specialized teams such as teams speaking languages other than English and Spanish could also be used for handling special categories of calls. Furthermore, it may be desirable to have operator teams which specialize in particular classes of operator assistance calls such as a team which specializes in person-to-person calls. The use of access codes keyed by customers with DTMF terminals, or spoken commands, can be used to route calls to an appropriate team. In order to utilize operators most efficiently, it may also be desriable to have traffic flow between teams where there is a temporary overload on one of the teams.

FIG. 10 is a flow diagram for subroutine S (1000) for responding to a spoken or keyed request for a Spanish-speaking operator. The system first retrieves the account data for the originating customer and data associated with the called number in order to prepare to set up an initial display for the operator who will handle this call. In addition, an initial transaction record is made in order to prepare for future billing of this call (action box 1002). Next, a test is made (decision bos 1004) of whether a Spanish-speaking operator (i.e., an operator on the specialized Spanish-speaking team) will be available within a predetermined interval. If so, then the customer is connected to a Spanish-speaking operator (i.e., a member of the specialized Spanish-speaking operator team) whose operator position has been initialized with the display of pertinent data generated by the control of switch 1 (action box 1006). Thereafter, the call is processed in essentially the same way as calls to the general operator (as described with respect to FIG. 4). If no Spanish-speaking operator is available within the predetermined interval, as indicated by the lengths of the queue of requests for a Spanish-speaking operator, then the call is connected to the general operator whose position will be initialized with the appropriate display of pertinent data (action box 1008). This general operator will then handle the call in the same way as other general operator assistance calls.

FIG. 11 is a flow diagram of subroutine M (1100) which is entered when a customer either dials the access code for a conference call operator or when the customer speaks the word "conference". FIG. 11 is very similar to FIG. 10 except for the fact that the conference operators have access to special facilities not available to members of some other operator teams for setting up multi-party conference calls. Initially, the system retrieves the account data for the calling customer and, if the calling customer has already dialed at least one number of a multi-party conference call, then for any such called customers on this call. The system then makes an initial transaction record for subsequent billing processing (action box 1102). Next, decision block 1104 shows a test to see whether a conference operator will be available within a predetermined interval. This test is based on the length of the queue for conference operator requests. If a conference operator will be available within a predetermined interval, then as soon as a conference operator is available the calling customer will be connected to a conference operator, the operator position will be initialized with the display of pertinent data gathered by the control of switch 1 (action box 1106). Otherwise, if no conference operator is available within the predetermined interval, the calling customer will be connected to a general operator whose operator position will be initialized with the appropriate display of pertinent data (action box 1108).

FIG. 12 is flow diagram of subroutine B (1200) entered when the code for a request for an operator from the customer credit and service bureau has been keyed by a customer with a DTMF terminal or the word "billing" has been spoken by a customer. In order to reduce the work time of an operator from this bureau, a prompt announcement is returned to the calling customer requesting the number of the account to receive credit. This number, in general, is the customer's directory number, but may also be a third number which is to receive credit in case the customer query is with respect to a bill to third number call, or may be a calling card number (action box 1202).

In response to the prompt announcement, the customer may key in a number if he has a DTMF terminal, may speak a response, may flash, or may do nothing. Test 1204 determines which of these actions has been taken by the customer. If the customer keys in a number, test 1206 is used to determine whether the number is a valid account number. If the number keyed in is a valid account number, then an announcement is returned to the caller stating the account number to allow the customer, to verify that the proper account is being handled, and data is retrieved from the data base of the customer credit and service bureau (action box 1208). One way that this data could be retrieved is if the data were located in a remote data base such as data base 20, accessed via data network 18 (FIG. 1). From the retrieved data the restrictions on the calling customer are determined and the system then makes an initial transaction record of this call (action box 1208). This initial transaction record is available for possible use in generating traffic data, and, as an initial record for possible use in conjunction with additional information, to provide appropriate credit to the proper account. Such initial records may also be useful to identify customers who generate excessive numbers of billing requests. The initial transaction record may also contain data which can be useful for subsequent analysis in order to identify possible sources of fraud.

At this point, the system is ready to connect a credit operator and in test 1210 a determination is made whether a credit operator will be available within a predetermined interval. If a credit operator (i.e., an operator from the customer credit and service bureau) is available, a connection is set up from the calling customer to the credit operator; the credit operator position is initialized with a display of the pertinent data gathered by the system (action box 1212). If no credit operator will be available within the predetermined interval, the customer is connected to a general operator whose operator position will be initialized with the appropriate display of pertinent data (action box 1214).

Returning now to test 1204 which checks on the response of the calling customer to the prompt announcement, if the calling customer's response is a spoken message, this message is analyzed (decision box 1229). If the message consists of a series of numbers representing a valid account number, then action box 1208 is entered in order to return an announcement to the customer stating the account number, to retrieve account data, and determine restrictions and make an initial record as previously described. If the customer's message consists of the word "operator", then the system retrieves the account data for the calling customer terminal, determines the calling customer restrictions and makes an initial transaction record (action box 1222). At this point, the system is ready to set up a connection to a credit operator by entering test 1210 for credit operator availability as previously described.

The action box 1222 is also entered if the customer's speech is not recognized by the system as representing an account number, in the same way as if the customer had spoken the word "operator". Also, if the account number spoken by the customer or keyed by the customer is not valid, then, action box 1222 is similarly entered. Finally, if the response to the prompt announcement as determined by decision block 1204 is either a flash or the customers fails to respond within a predetermined interval as detected by time out block 1224, action box 1222 is similarly entered.

Note that the facilities of the voice processing unit are used extensively in this subroutine to minimize the amount of data which is transmitted verbally from the calling customer directly to the credit operator; as a result, the work time of the credit operator is substantially reduced.

FIG. 13 is a flow diagram of an alternate method of handling calling card calls by customers who have not keyed in their calling card number. In the alternate method of FIG. 13, represented by subroutine K' (1300), spoken calling card numbers are recognized. The initial step (action box 1302) for subroutine 1300 is the same as the initial step (action box 602) for subroutine 600. Further, if it is determined that no calling card call is allowed, the actions represented by action box 1306 and 1308 are the same as the action boxes 606 and 608 of subroutine K (600). However, if a decision is made that a calling card call is allowed, then a prompt announcement is returned to the caller (action box 1310). The caller response is analyzed (decision box 1312). If the caller has keyed tones, test 1314 determines whether these tones represent a calling card number: if not, the customer is connected to an operator; if so, standard automated Calling Card Service treatment (action box 1316) is accorded to the calling customer. If the caller's response to the prompt announcement is either a flash or no response within a predetermined interval (timeout, action box 1313), then subroutine O is entered and the caller is connected to an operator. If the caller speaks, this speech is analyzed in decision box 1320. If the speech is interrupted by a flash or the customer's response is anything else other than a calling card number, or if the customer does not respond within a predetermined interval, subroutine O is entered and the calling customer is connected to an operator. If the calling customer speaks a calling card number, this number is repeated back to the caller (action box 1322) along with a request that the caller verify the calling card number. The caller's response is analyzed in decision box 1324. If the response is recognized as "yes", then standard automated Calling Card Service treatment is provided for this call (action box 1316). If a "no" is recognized or any other speech is recognized, or if there is no response within a predetermined interval (timeout, action box 1326), a transfer is made to subrouting O and the customer is connected to an operator. If experience indicates that it is not necessary to repeat calling card numbers to the calling customer, this step can be bypassed at the option of the telephone company. This is entirely possible since all calling card numbers are verified and it is unlikely that errors would result in a valid calling card number.

Note that in all of the sequences described above, a customer is connected to an operator if a customer having a DTMF terminal keys a 0, if any customer flashes, or if the automatic speech recognition system fails to recognize an appropriate expression after appropriate reprompt tones or announcements.

The above description is considered to be only an illustrative embodiment of the invention. Other alternatives are possible without departing from the spirit of the invention. For example, a service to the handicapped may be offered by asking them to speak an identifying command followed by a spoken directory number to allow them to set up standard, normally dialed, calls. Further, it is possible to have many different tradeoffs between what is recognized by automatic voice processing techniques and what is recognized only by use of an operator. Prompting tones and prompting announcements can be selected based on experience in human factors tests and can be changed as customers become more sophisticated. It is to be understood that various and numerous other arrangements may be devised by one skilled in the art without departing from the spirit and scope of the invention. The invention is thus limited only as defined in the accompanying claims.

What is claimed is:

1. In a telecommunications switch offering operator assistance services, a method of setting up a collect call from a calling customer terminal to a called customer terminal, comprising the steps of:
    receiving a request comprising data identifying said called customer terminal and data identifying said call as a collect call, to set up said call;
    transmitting a request to an interconnection network to set up a connection from said telecommunications switch to said called customer terminal;
    detecting an answer by said called customer terminal; and
    after said answer has been detected, connecting an operator position to the call connection.

2. The method of claim 1 further comprising the step of:
    responsive to receiving said request, accessing data base means to obtain calling customer data.

3. The method of claim 1 further comprising the step of:
    responsive to receiving said request, accessing data base means to obtain called customer data.

4. The method of claim 3 further comprising the step of:
    responsive to obtaining said called customer data, displaying said data at said operator position.

5. The method of claim 4 wherein said displaying step comprises the step of displaying said data wherein said data comprises an option for treatment of collect calls.

6. The method of claim 2 further comprising the step of displaying said data obtained in said accessing step at said operator position.

7. In a telecommunications switch offering operator assistance services, a method of setting up a collect call from a calling customer terminal to a called customer terminal comprising the steps of:
    receiving a request, comprising data identifying said called customer terminal and data identifying said call as a collect call, to set up said call;
    transmitting a request to an interconnection network to set up a connection from said telecommunications switch to said called customer terminal;
    detecting an answer by said called customer terminal;
    connecting an announcement to said called customer terminal;
    connecting an automatic voice processing system to said called customer terminal for detecting a positive response; and
    setting up a connection between said calling customer terminal and said called customer terminal in response to said detection of said positive response.

8. In a telecommunications switch offering operator assistance services, a method of setting up a collect call from a calling customer terminal to a called customer terminal, comprising the steps of:
    receiving a request, comprising data identifying said called customer terminal and data identifying said call as a collect call, to set up said call;
    prompting a customer at said calling customer terminal to speak a calling identity;
    recording the response to said prompt;
    transmitting a request to an interconnection network to set up a connection from said telecommunications switch to said called customer terminal;
    detecting an answer by said called customer terminal;
    connecting an announcement to said called customer terminal, said announcement comprising said recorded response to said prompt;
    connecting an automatic voice processing system to said called customer terminal for detecting a positive response; and
    setting up a connection between said calling customer terminal and said called customer terminal in response to said detection of said positive response.

9. In a telecommunications switch offering operator assistance services, a method of setting up a person-to-person call from a calling customer terminal to a called customer terminal, comprising the steps of:
    receiving a request, comprising data identifying said called customer terminal and data identifying said call as a person-to-person call, to set up said call;
    transmitting a request to an interconnection network to set up a connection from said telecommunications switch to said called customer terminal;
    detecting an answer by said called customer terminal; and
    after said answer has beed detected, connecting an operator position to the call connection.

10. The method of claim 9 further comprising the step of:
    responsive to receiving said request, accessing data base means to obtain calling customer data.

11. The method of claim 10 further comprising the step of displaying said data obtained in said accessing step at said operator position.

12. The method of claim 10 further comprising the step of:
    responsive to receiving said request, accessing data base means to obtain called customer data.

13. The method of claim 12 further comprising the step of displaying said data obtained in said accessing step at said operator position.

14. The method of claim 9 further comprising the step of displaying an indication of a person-to-person call at said operator position.

* * * * *